United States Patent
San Juan

(12) 
(10) Patent No.: US 6,463,488 B1
(45) Date of Patent: Oct. 8, 2002

(54) APPARATUS AND METHOD FOR TESTING MASTER LOGIC UNITS WITHIN A DATA PROCESSING APPARATUS

(75) Inventor: Martin San Juan, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 09/332,526

(22) Filed: Jun. 14, 1999

(30) Foreign Application Priority Data

Jun. 22, 1998 (GB) .............................. 9813441

(51) Int. Cl.$^7$ ............................... G06F 13/00
(52) U.S. Cl. ......................... 710/107; 714/10
(58) Field of Search ......................... 710/107, 113–125, 710/240–244; 714/10, 11, 23

(56) References Cited

U.S. PATENT DOCUMENTS 5,815,509 A * 9/1998 Deng et al.
6,073,132 A * 6/2000 Gehman ..................... 707/9
6,199,132 B1 * 3/2001 Hewitt et al. ............... 710/107

FOREIGN PATENT DOCUMENTS

EP 0067294 A2 12/1982
EP 0175873 A2 4/1986
WO 84/00220 A1 1/1983

* cited by examiner

Primary Examiner—Paul R. Meyers
(74) Attorney, Agent, or Firm—Nixon & Vanderhye P.C.

(57) ABSTRACT

The present invention provides a data processing apparatus and method of testing a master logic unit within a data processing apparatus, the data processing apparatus comprising one or more master logic units for accessing a bus in order to initiate processing requests, and a test controller for testing logic units of the data processing apparatus. Further, an arbiter is provided for receiving bus request signals from the test controller and the one or more master logic units, and for applying predetermined priority criteria to control access to the bus by the test controller and the master logic units, the predetermined priority criteria identifying the relative priority of each master logic unit and the test controller. In a normal test mode, the test controller has a higher priority than any of the master logic units to be tested. However, in a master test mode, when master functionality of a first master logic unit is to be tested by the test controller, the arbiter is arranged to receive a priority access signal to cause the arbiter to assign the first master logic unit a higher priority than the test controller, in order to allow the first master logic unit to have access to the bus in order to generate a test processing request.

By this approach, the master logic unit being tested can fully exercise its master functionality, since the master logic unit is allowed to drive processing requests onto the bus in a controlled manner.

19 Claims, 4 Drawing Sheets

APPARATUS AND METHOD FOR TESTING MASTER LOGIC UNITS WITHIN A DATA PROCESSING APPARATUS

BACKGROUND OF THE INVENTION

1. Field of the Invention

The present invention relates to an apparatus and method for testing master logic units within a data processing apparatus.

2. Description of the Prior Art

A common technique for testing a logic unit within a data processing apparatus is to stimulate that logic unit's inputs with test data and to capture the outputs via test accesses. These test accesses are seen as normal accesses by the logic unit (often referred to as the "Unit Under Test" (UUT)), the only difference being that the accesses are stimulated and controlled externally via a test interface driver, which is coupled to the data processing apparatus via a dedicated test access port.

This approach works well for UUTs that are designed to be recipients of processing requests rather than initiating such processing requests. Such logic units can be referred to as "slave" logic units, whereas logic units that are designed to initiate processing requests can be referred to as "master" logic units.

When testing master logic units using the above technique, the UUT needs to be reconfigured so that it can act as a recipient of processing requests generated by a test controller. This reconfiguration allows testing of the internal logic of the master logic unit to a certain extent, but requires special logic to be incorporated for test purposes. The special logic is used to drive the internal inputs (that in normal conditions would be provided by the slave that is communicating with the master), and to sample the outputs (that in normal conditions will be destined for the slave that is communicating with the master).

The overhead of this extra test logic is often justified by the intrinsic complexity and size of the master logic unit's internal logic. However, there are a significant number of cases where the small size and complexity of the master logic unit does not justify the comparatively large test logic overhead.

Further, although this extra test logic allows a significant part of the master logic unit's internal logic to be validated, the interface and the associated logic that enables the master logic unit to drive processing requests onto the system bus (ie the logic that enables the master logic unit to act as a "master") remains untested.

An object of the present invention is to provide a technique which allows more effective testing of a master logic unit within a data processing apparatus.

SUMMARY OF THE INVENTION

Viewed from a first aspect, the present invention provides a data processing apparatus, comprising: one or more master logic units for accessing a bus in order to generate processing requests; a test controller for testing logic units of the data processing apparatus; an arbiter for receiving bus request signals from the test controller and the one or more master logic units, and for applying predetermined priority criteria to control access to the bus by the test controller and the master logic units, the predetermined priority criteria identifying the relative priority of each master logic unit and the test controller; in a normal test mode, the test controller having a higher priority than any of the master logic units to be tested; and in a master test mode, when master functionality of a first master logic unit is to be tested by the test controller, the arbiter being arranged to receive a priority access signal to cause the arbiter to assign the first master logic unit a higher priority than the test controller, in order to allow the first master logic unit to have access to the bus in order to generate a test processing request.

In accordance with the present invention, the data processing apparatus has one or more master logic units which may access a bus in order to generate processing requests, and a test controller for testing logic units of the data processing apparatus. Predetermined priority criteria are provided identifying the relative priority of each master logic unit and the test controller, and an arbiter is provided for applying the predetermined priority criteria in order to determine which of the one or more master logic units or the test controller should have access to the bus at any particular moment in time. Indeed, the test controller is a master logic unit itself, and the arbiter merely treats the test controller as one of the master logic units. Only one master logic unit can access the bus at any particular moment in time, and the arbiter ensures that, of all the units requesting access to the bus, the unit having the highest priority (whether it be the test controller or one of the master logic units) is granted access to the bus.

In a normal test mode, the test controller has a higher priority than any of the master logic units being tested, and hence the master logic units being tested cannot be granted access to the bus whilst the test controller is performing testing. Hence, in normal test mode, the master logic unit under test is unable to drive processing requests onto the bus, and so the interface functionality of the master logic unit cannot be tested. However, in accordance with the present invention, a master test mode is provided, in which when master functionality of a first master logic unit is to be tested by the test controller, the arbiter is arranged to receive a priority access signal to cause the arbiter to assign the first master logic unit a higher priority than the test controller. This allows the first master logic unit to have access to the bus in order to generate a test processing request, even though the test controller may still be requesting access to the bus. By this approach, the master logic unit being tested is allowed to fully exercise its master functionality by allowing that master logic unit to drive processing requests onto the bus in a controlled manner.

Hence, it can be seen that the technique of the present invention enables the interface logic of the master logic unit to be tested, this also inherently causing parts of the core logic of the master logic unit that interact with the interface logic to be tested. This enables the complexity and size of the actual test logic provided within the master logic unit to test the core logic to be reduced over that required by the previously discussed prior art technique.

In preferred embodiments, upon completion of the test processing request, the priority access signal is deactivated, so that subsequent access to the bus is controlled by the predetermined priority criteria. Clearly, the exact moment in time at which the priority access signal is deactivated will depend on the manner in which the arbiter grants access to the bus, and hence the priority access signal can be deactivated at any appropriate point following completion of the test processing request by the first master logic unit. Further, in alternative embodiments, as will be discussed later, the priority access signal can be continuously asserted throughout a sequence of test processing requests, and then deactivated once the entire sequence of test processing requests has been completed.

Preferably, upon completion of the test processing request, the test controller is arranged to access the results of the test processing request performed by the first master logic unit. Since upon completion of the test processing request, the priority access signal is typically deactivated, thereby causing the arbiter to once again control access to the bus in accordance with the predetermined priority criteria, this enables the test controller to read the appropriate registers or memory locations in order to retrieve the results of the test processing request, and thereby determine whether the master logic unit being tested has functioned correctly.

The priority access signal may itself be a bus request signal issued instead of, or in addition to, the first master logic unit's normal bus request signal when the master logic unit is being tested in the master test mode. However, in preferred embodiments, the priority access signal comprises a priority enable signal arranged to cause the arbiter to assign the first master logic unit a higher priority than the test controller, such that the first master logic unit will be given access to the bus upon issuing its normal bus request signal.

Preferably, the master logic unit is arranged to assert its normal bus request signal to request access to the bus in order to enable the test processing request to be driven onto the bus, and the arbiter is arranged to grant the first master logic unit access to the system bus if the priority enable signal is asserted. Further, the master logic unit is preferably arranged to disassert its normal bus request signal upon completion of the test processing request, thereby allowing the test controller to be granted access to the bus.

There are clearly many ways in which the priority access signal may be issued in the master test mode. For example, the test controller may itself be arranged to issue the priority access signal. However, this is not the preferred option, since it requires the test controller to have specific knowledge of the master logic units of the data processing apparatus, thereby inhibiting the provision of a generic test controller. Hence, in preferred embodiments, the first master logic unit is arranged to issue the priority access signal to the arbiter in the master test mode. More specifically, in preferred embodiments, the first master logic unit contains a test register from which the priority access signal is asserted, and the priority access signal is asserted to the arbiter by the first master logic unit when the first master logic unit is to be tested in said master test mode.

Further, upon initiating a test of the first master logic unit in said master test mode, the test controller is preferably arranged to cause the priority access signal to be asserted via the test register of the first master logic unit. In preferred embodiments this is achieved by arranging the test controller to write a first logic value into the test register to cause the priority access signal to be asserted. For example, a logic '1' value may be written into the test register by the test controller, in order to cause the priority access signal to be asserted.

In such an embodiment, a second logic value is preferably written into the test register to cause the priority access signal to be disasserted. This may be done on completion of the test processing request, or, as mentioned earlier, may be done after a predetermined sequence of test processing requests have been completed. Since in preferred embodiments, the priority access signal is a priority enable signal which allows the first master logic unit to be granted access to the bus when it issues its normal bus request signal, then the test controller can be granted access to the bus when the normal bus request signal of the first master logic unit is disasserted, even if the priority enable signal remains asserted. This enables a sequence of tests to be performed whilst the priority enable signal remains high.

There are clearly a number of ways in which the second logic value can be written into the test register to cause the priority access signal to be disasserted. For example, the first master logic unit may be arranged to cause the second logic value to be stored in the test register upon completing the test processing request. However, in preferred embodiments, upon being granted access to the bus after completion of the test processing request by the first master logic unit, the test controller is arranged to write a second logic value into the test register of the first master logic unit to cause the priority access signal to be disasserted. This latter approach is preferable, because the test controller retains control for disasserting the priority access signal, and hence the flexibility for performing a plurality of test sequences before disasserting the priority access signal is retained.

It will be appreciated by those skilled in the art that the exact construction of the arbiter is a matter of design choice. However, in preferred embodiments, the arbiter comprises a priority encoder for receiving the priority access signal and any bus request signals from the test controller and the one or more master logic units; the arbiter being arranged to apply the predetermined priority criteria in the absence of said priority access signal in order to generate a signal identifying which of the test controller and master logic units requesting the bus has the highest priority; and the arbiter being arranged upon receipt of the priority access signal to assign the first master logic unit a higher priority than the test controller irrespective of the predetermined priority criteria and to generate a signal identifying the highest priority master logic unit requesting the bus.

Preferably, the arbiter further comprises grant generation logic for receiving the signal from the priority encoder, and for sending a bus grant signal to the test controller or one of the master logic units, as identified by the signal from the priority encoder.

In preferred embodiments, the first master logic unit comprises test logic for controlling testing of the first master logic unit in said normal test mode. In preferred embodiments, no further test logic is required within the first master logic unit to enable the first master logic unit to be tested in the master test mode.

Viewed from a second aspect, the present invention provides a method of testing a master logic unit within a data processing apparatus, the data processing apparatus comprising one or more master logic units arranged to access a bus in order to generate processing requests, a test controller for testing logic units of the data processing apparatus, and an arbiter for receiving bus request signals from the test controller and the one or more master logic units, and for applying predetermined priority criteria to control access to the bus by the test controller and the master logic units, the predetermined priority criteria identifying the relative priority of each master logic unit and the test controller, the method comprising the steps of:

(a) arranging the test controller to initiate a test of master functionality of the first master logic unit in a master test mode;

(b) issuing a priority access signal to the arbiter to cause the arbiter to assign the first master logic unit a higher priority than the test controller;

(c) granting the first master logic unit access to the system bus; and (d) arranging the first master logic unit to generate a test processing request.

In preferred embodiments, the priority access signal comprises a priority enable signal arranged to cause the arbiter to assign the first master logic unit a higher priority than the test controller, and said step (c) comprises granting the first master logic unit access to the bus when the first master logic unit issues its normal bus request signal.

Preferably, the master logic unit is arranged to assert its normal bus request signal to request access to the bus in order to enable the test processing request to be driven onto the bus, and the first master logic unit is granted access to the system bus at said step (c) if the priority enable signal is asserted. Further, the master logic unit is preferably arranged to disassert its normal bus request signal upon completion of the test processing request, thereby allowing the test controller to be granted access to the bus.

In preferred embodiments, said step (b) comprises the step of the first master logic unit asserting the priority access signal to the arbiter when the first master logic unit is to be tested in said master test mode. Further, upon initiating a test of the first master logic unit in said master test mode at said step (a), the test controller is preferably arranged to cause the priority access signal to be asserted by the first master logic unit at said step (b).

BRIEF DESCRIPTION OF THE DRAWINGS

The present invention will be described further, by way of example only, with reference to preferred embodiments thereof as illustrated in the accompanying drawings, in which.

DESCRIPTION OF A PREFERRED EMBODIMENT

Figure 1:
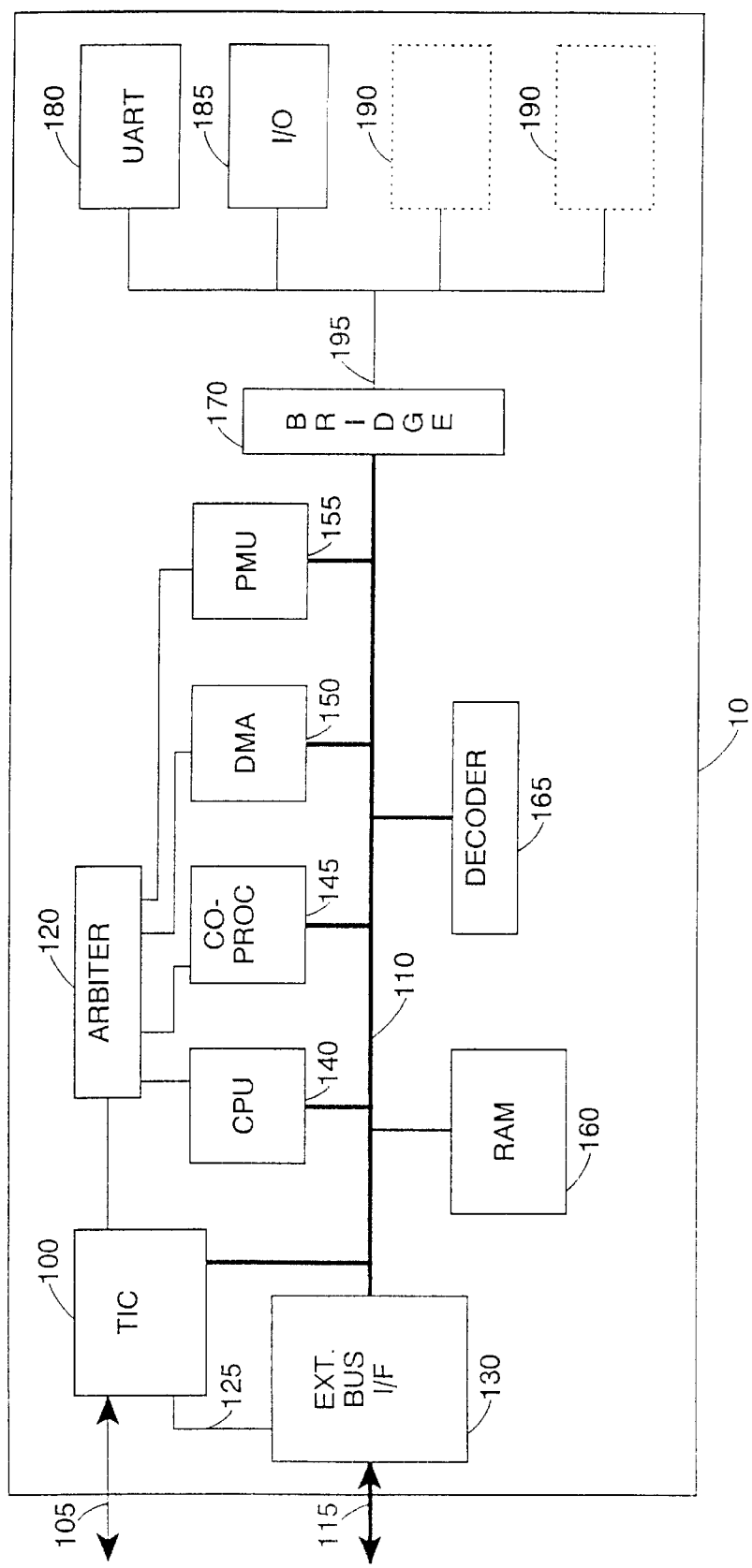
FIG. 1 is a block diagram illustrating a data processing apparatus in accordance with preferred embodiments of the present invention.

FIG. 1 illustrates a data processing apparatus in accordance with the preferred embodiment of the present invention, where the data processing apparatus takes the form of a microcontroller chip 10. The chip 10 has a system bus 110 and a peripheral bus 195 connected via a bridge circuit 170. In accordance with preferred embodiments of the present invention these buses operate in accordance with the "Advanced Microcontroller Bus Architecture" (AMBA) specification developed by ARM Limited. The AMBA specification defines an on-chip communication standard for designing high performance 32-bit and 16-bit embedded microcontrollers, with the system bus 110 being used for high performance system modules, whilst the peripheral bus is used for low power peripheral devices. The high performance system bus 110 is able to sustain the external memory bandwidth, with the CPU and other Direct Memory Access devices residing on the system bus, whilst a bridge circuit 170 connects the system bus to a narrower peripheral bus 195 on which the low bandwidth peripheral devices are located. The bridge circuit 170 performs the necessary protocol conversion between the system bus 110 and the peripheral bus 195.

It will be appreciated by those skilled in the art that there is no requirement for a data processing apparatus to employ the AMBA specification in order to benefit from the present invention, but rather the discussion of a chip employing the AMBA specification is provided herein merely to illustrate an example of a chip in which the present invention may be employed.

The chip 10 has a number of master logic units connected to the system bus 110, namely a test controller (referred to hereafter as a Test Interface Controller (TIC)) 100, a CPU 140, a coprocessor 145, a DMA controller 150, and a Power Management Unit (PMU) 155. Only one of the master logic units may have access to the system bus at any particular instance in time, and hence an arbiter 120 is provided to control access to the system bus 110 by the various master logic units. When a master logic unit wishes to have access to the system bus 110, it issues a bus request signal to the arbiter 120. If only one bus request signal is received by the arbiter 120 at any particular instance in time, it will grant access to the master logic unit that issued that bus request signal. However, if more than one bus request signal is received by the arbiter at any particular instance in time, the arbiter is arranged to apply predetermined priority criteria in order to determine which master logic unit should have access to the system bus 110. Of all of the master logic units requesting access to the bus, the arbiter 120 is arranged to grant access to the master logic unit having the highest priority. In preferred embodiments, the relative priorities of each master logic unit is as follows, with the highest priority master logic unit being listed first:

1 Test Interface Controller (TIC) 100
2 DMA controller 150
3 Power Management Unit (PMU) 155
4 CPU 140
5 Coprocessor 145.

Based on this predetermined priority criteria, it will be appreciated that the TIC 100 will always get access to the bus when requesting it, since it is the highest priority master logic unit. However, the TIC 100 will only request access to the bus when a test process is being performed, and hence during normal operation (when no testing is being performed), the TIC 100 will not hinder access to the system bus 110 by the other master logic units.

In addition to the master logic units, one or more slave logic units may be connected to the system bus 110. For the sake of clarity, only one slave logic unit, namely the Random Access Memory (RAM) 160 is illustrated in FIG. 1. When an instruction request is issued to a slave logic unit, an address will be output on the system bus 110, and this will be decoded by the decoder logic 165 in order to determine which slave logic unit is to process that instruction. The decoder will then notify the appropriate slave logic unit accordingly. It should be noted that, with the exception of the TIC 100, the master logic units may be arranged to operate as slave logic units during testing, and hence the decoder 165 may be arranged to notify those master logic units when they are to operate in that slave mode.

A number of peripheral devices may be connected to the peripheral bus 195. Two examples of such peripheral devices are a "Universal Asynchronous Receive and Transmit" (UART) logic unit 180 for receiving and transmitting serial data, and an input/output port 185. Further peripheral devices may also be added, as indicated by the dotted boxes 190 in FIG. 1.

In accordance with preferred embodiments of the present invention, the system bus 110 is also connected to an external bus 115 via an external bus interface 130. In preferred embodiments the external bus 115 is a 32-bit vector bus. When performing testing, the external bus interface 130 is used as a test access port, with test data and addresses being input over the external bus 115, whilst the TIC 100 controls the external bus interface 130 over path 125 dependent upon external control signals received by the TIC over path 105.

Figure 2:
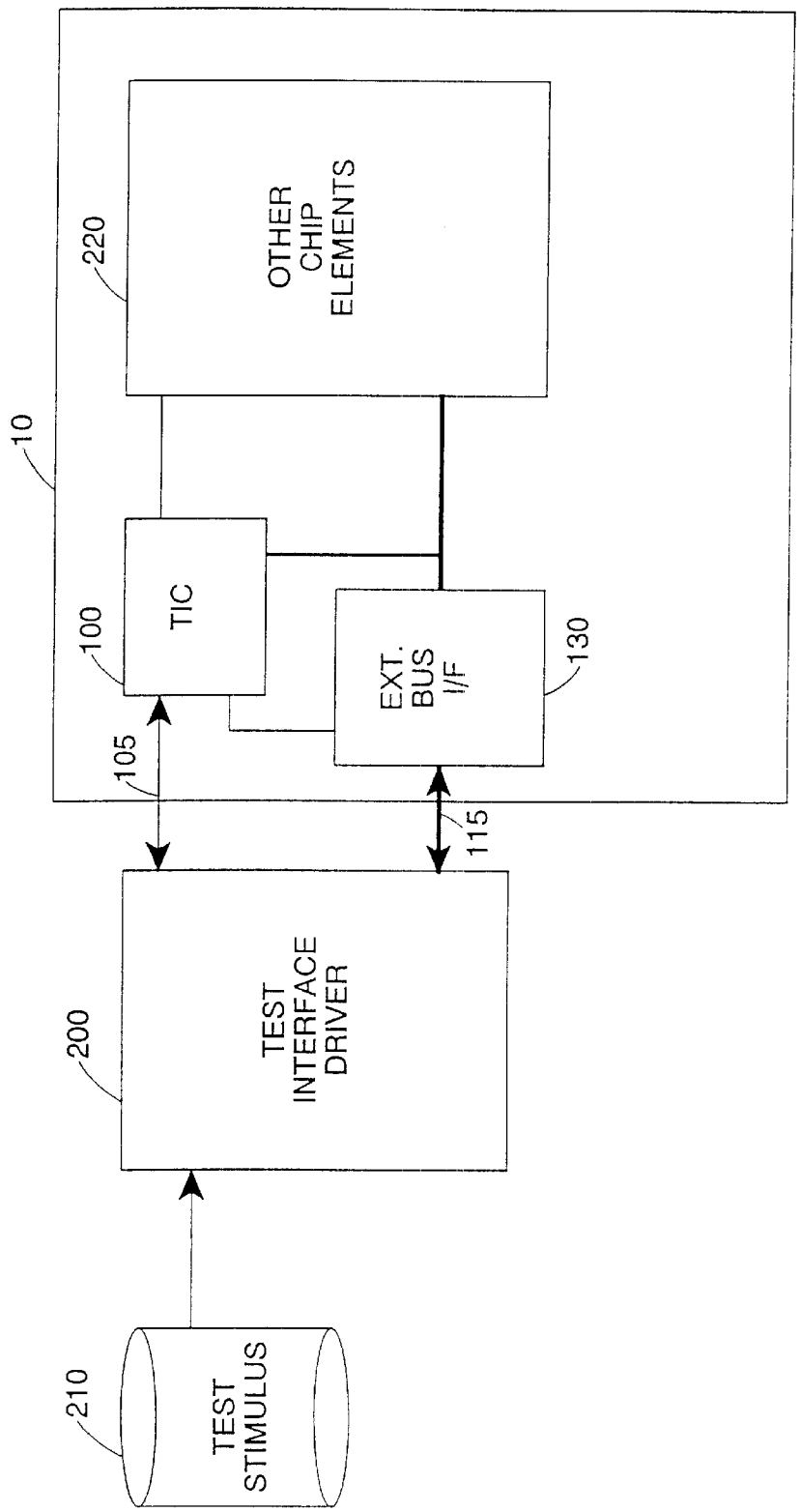
FIG. 2 is a block diagram illustrating how a test interface driver is connected to the data processing apparatus in accordance with preferred embodiments of the present invention.

As illustrated in FIG. 2, an external test interface driver 200 is used to provide the control signals to the TIC 100 over path 105, and to provide the test data and addresses to the external bus interface 130 over the external memory bus 115. It will be appreciated that the exact structure of the test interface driver 200 is not relevant to the present invention, but in one embodiment the test interface driver 200 may take the form of a test board on which test stimulus 210 is loaded in order to enable particular test sequences to be performed. Alternatively, the test interface driver 200 may take the form of a simulation test engine, typically implemented in software.

All of the master logic units, with the exception of the TIC 100, can be tested using the above described approach of configuring the external bus interface 130 as a test access port, and supplying test data and addresses from an external test interface driver over the external bus 115. In accordance with the normal test mode, the TIC 100 is arranged to assert a bus request signal to the arbiter 120, and given the above mentioned predetermined priority criteria, the TIC will be granted access to the bus as it is the highest priority master logic unit. With this arrangement, the other master logic units cannot be granted access to the bus whilst the TIC is performing testing, and hence the interface functionality of the master logic units 140, 145, 150 and 155 cannot be tested. However, in accordance with preferred embodiments of the present invention, a master test mode is provided to allow these master logic units to perform real master accesses during testing in order to verify their functionality. The manner in which this is achieved is discussed in more detail with reference to FIG. 3.

Figure 3:
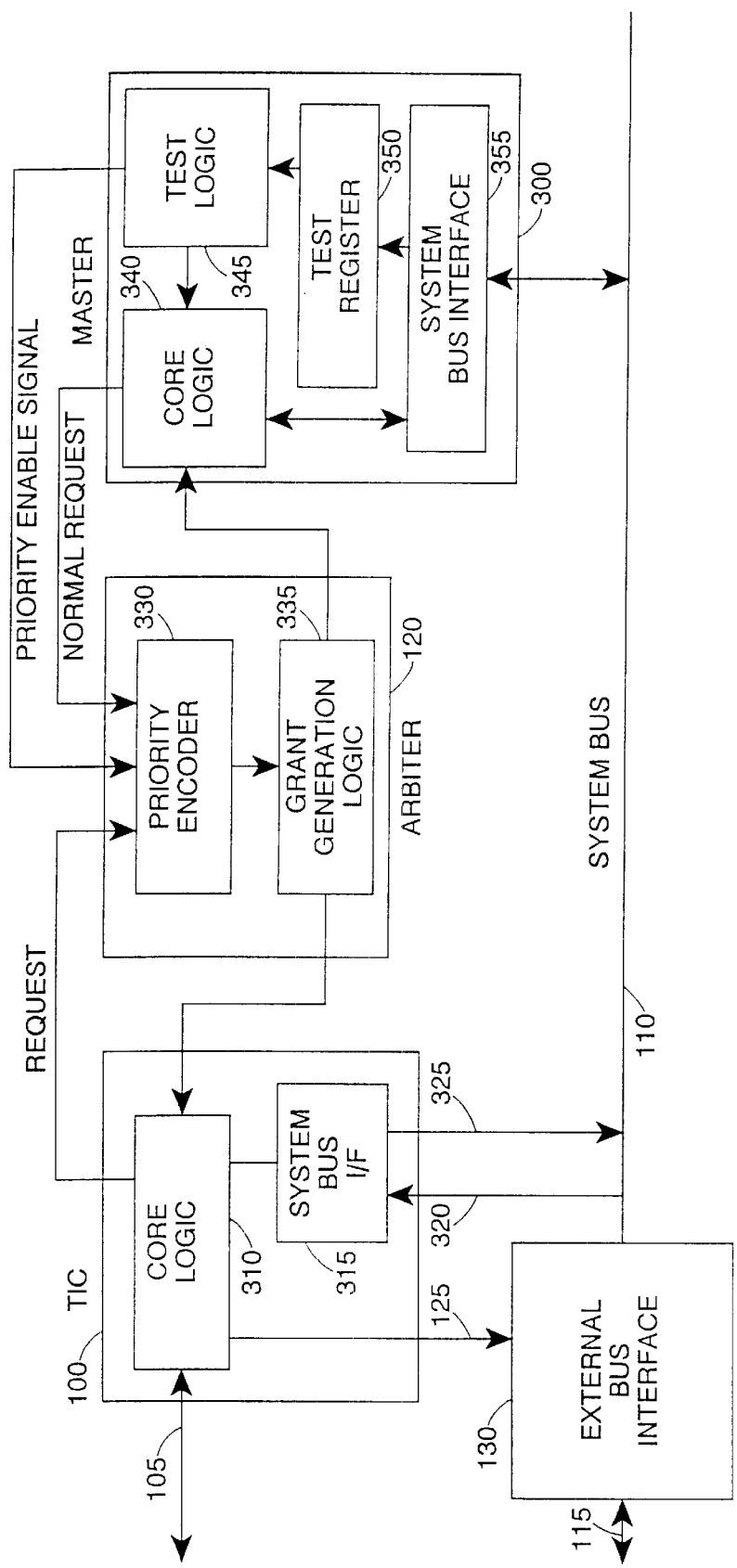
FIG. 3 is a block diagram illustrating in more detail components of the data processing apparatus in accordance with preferred embodiments of the present invention.

As illustrated in FIG. 3, a master logic unit 300 contains core logic 340, and test logic 345. Further, a system bus interface 355 is provided to enable the master logic unit 300 to interface with the system bus 110.

The TIC 100 also contains core logic 310, and a system bus interface 315. As discussed earlier, when performing testing, test control signals are received by the core logic 310 of the TIC 100 over path 105 from an external test interface driver, and the core logic is then arranged to control the external bus interface over the path 125 to cause the external bus interface 130 to operate as a test access port. Test data and addresses received by the external bus interface 130 over the external bus 115 are output on the data bus of the system bus 110, and the TIC 100 is arranged to retrieve test addresses from the data bus over path 320, and to arrange the system bus interface 315 to output those test addresses on the address bus of the system bus 110.

The arbiter 120 contains a priority encoder 330 which is arranged to receive bus request signals from any of the master logic units 100, 140, 145, 150 and 155, and to apply the predetermined priority criteria in order to determine which master logic unit should be granted access to the system bus 110. The output of the priority encoder 330 is then passed to grant generation logic 335 within the arbiter 120, which is arranged to generate a bus grant signal to the master logic unit that the priority encoder 330 has indicated should have access to the system bus. However, in accordance with preferred embodiments of the present invention, the priority encoder is also arranged to receive a priority enable signal from the master logic unit 300, upon receipt of this priority enable signal, the priority encoder assigning the master logic unit 300 a higher priority than the TIC 100.

Hence, assuming for the sake of example that the master logic unit 300 is the DMA controller 150, then upon receipt of the priority enable signal, the priority encoder will be arranged to alter the relative priorities of the master logic units, such that the relative priorities of the TIC and DMA controller are swapped, in order to give the following relative priorities (with the highest priority master logic unit listed first):

1 DMA controller 150
2 TIC 100
3 PMU 155
4 CPU 140
5 Coprocessor 145.

Assuming for the sake of simplicity that the DMA controller 150 is the only master logic unit that is able to issue the priority enable signal, then the decoding of all requests by the priority encoder 330 can be implemented through the following look-up table, where "HIGH" indicates that the bus request signal is asserted, "LOW" indicates that the bus request signal is not asserted, and "XXX" indicates that it does not matter whether the bus request signal is asserted or not:

| DMA Priority Enable Signal | BUS REQUEST SIGNAL | | | | | Grant |
|---|---|---|---|---|---|---|
| | TIC | DMA | PMU | CPU | Coproc | |
| Low | High | XXX | XXX | XXX | XXX | TIC |
| High | High | High | XXX | XXX | XXX | DMA |
| High | High | Low | XXX | XXX | XXX | TIC |

When not in test mode, the TIC bus request signal and the DMA priority enable signal will always be low, and the look-up take will be as follows:

| DMA Priority Enable Signal | BUS REQUEST SIGNAL | | | | | Grant |
|---|---|---|---|---|---|---|
| | TIC | DMA | PMU | CPU | Coproc | |
| Low | Low | High | XXX | XXX | XXX | DMA |
| Low | Low | Low | High | XXX | XXX | PMU |
| Low | Low | Low | Low | High | XXX | CPU |
| Low | Low | Low | Low | Low | High | Coproc |

Figure 4:
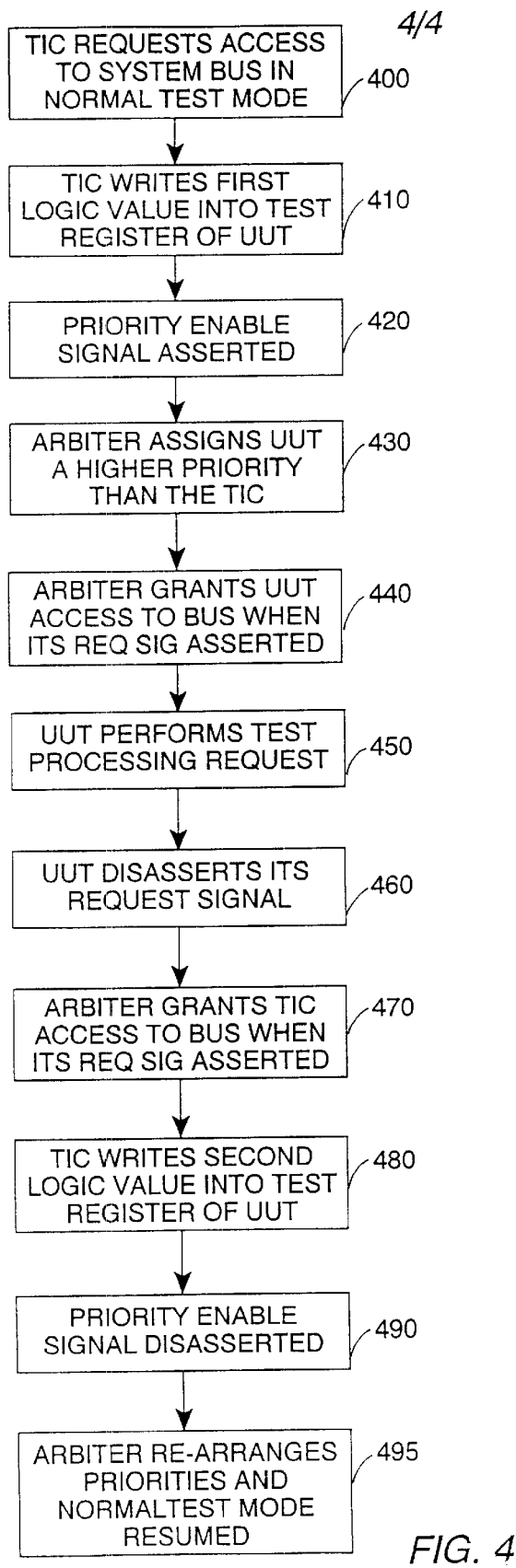
FIG. 4 is a flow diagram illustrating how the use of a priority enable signal is used to enable a master logic unit under test to drive processing requests onto the system bus.

The manner in which the priority enable signal is generated in accordance with preferred embodiments will now be discussed further with reference to FIG. 3 and the flow diagram of FIG. 4. Firstly, the TIC 100 begins to test the master logic block 300, and accordingly issues at step 400 a bus request signal to the arbiter 120 in order to be granted access to the system bus 110. At this point the master logic unit 300 is in slave mode. The TIC 100 then accesses a test register 350 within the master logic unit 300 and writes a first logic value into the test register 350 (step 410). In preferred embodiments, this first logic value is a logic "1" value, which indicates that the priority enable signal should be asserted. The test logic 345 then receives the contents of the test register 350, and accordingly outputs the priority enable signal to the priority encoder 330 of the arbiter 120 (step 420). The priority encoder 330 is responsive to receipt of the priority enable signal from the master logic unit 330 to rearrange the priority encoder to give the master logic unit 300 a higher priority than the TIC 100 (step 430).

At some point during the test, the core logic 340 of the master logic unit 300 will assert its normal bus request signal to the priority encoder 330 of the arbiter 120, since the core logic 340 will wish to drive a test processing request out onto the system bus 110. It will be appreciated that the data required by the core logic 340 in order to generate the test processing request may be provided directly by the test logic 345, or indeed may be provided in a number of different ways, for example by being written into registers of the master logic unit during some previous step when the master logic unit was acting in slave mode.

Since the priority enable signal has been asserted, then the priority encoder will respond to receipt of the normal bus request signal from the core logic 340 by outputting a signal to the grant generation logic 335 instructing the grant generation logic 335 to grant the master logic unit 300 access to the system bus 100 (step 440). It is typically the case that the normal bus request signal is already asserted by the time the priority enable signal is asserted. This is because the TIC 100 will typically know, or at least can monitor, when the master logic unit 300 has a processing request. This is the normal reason why the TIC 100 will cause the priority enable signal to be activated in the first place.

Upon receipt of the grant signal, the core logic 340 is arranged to perform the test processing request in its normal master mode of operation (step 450), by outputting the request via the system bus interface 355 onto the system bus 110. Upon completion of the processing request, the master under test will then drive its normal bus request signal low (step 460). Since the normal bus request signal of the master logic unit 300 is now low, the arbiter 120 will grant the TIC 100 access to the system bus 110 (step 470), even though the priority enable signal is still active (this is assuming that the test controller is requesting access to the system bus at this time).

Once the TIC 100 has been granted access to the system bus, it then accesses the test register 350 in order to write a second logic value into the test register (step 480). In preferred embodiments this second logic value is a logic "0" value, indicating that the priority enable signal should be disasserted. This causes the test logic 345 to stop outputting the priority enable signal to the arbiter 120 (step 490), and hence the arbiter will rearrange the priority encoder again such that subsequent requests are handled in accordance with the predetermined priority criteria discussed earlier (step 495). In preferred embodiments, in accordance with the predetermined priority criteria, the TIC 100 has the highest priority, and any bus request signals issued by the master logic unit will then be ignored until a further TIC access to the test register 350 is used to activate the priority enable signal again. After deactivating the priority enable signal, the TIC 100 will typically continue by checking the results of the test processing request.

Given the above technique, there is scope during the test to activate the priority enable signal at the beginning of a test, and not to clear that signal until the end of the test, hence allowing the master logic unit 300 under test to perform a plurality of test processing requests. This will typically depend on the nature of the master logic unit being tested, and the test logic implementation.

By incorporating the above described technique, the system bus interface of the master logic unit is tested, which inherently involves testing of the core logic of the master logic unit. Hence, the complexity of the actual test logic within the master logic unit required to test the core logic can be reduced over that required in accordance with the prior art techniques. Thus, the above interactive master block testing technique is particularly useful for testing uncomplex or small master logic units in which a full "slave mode" test logic is not justified. It also extends block test coverage by allowing the master interface logic to be exercised in the normal way and hence reducing the requirement for a full top level test of this logic.

Although a particular embodiment has been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

I claim:

1. A data processing apparatus, comprising:
   one or more master logic units for accessing a bus in order to generate processing requests;
   a test controller for testing said master logic units of the data processing apparatus;
   an arbiter for receiving bus request signals from the test controller and the one or more master logic units, and for applying predetermined priority criteria to control access to the bus by the test controller and the master logic units, the predetermined priority criteria identifying the relative priority of each master logic unit and the test controller;
   in a normal test mode, the test controller having a higher priority than any of the master logic units to be tested; and
   in a master test mode, when master functionality of a first master logic unit is to be tested by the test controller, the arbiter being arranged to receive a priority access signal to cause the arbiter to assign the first master logic unit a higher priority than the test controller, in order to allow the first master logic unit to have access to the bus in order to generate a test processing request.

2. A data processing apparatus as claimed in claim 1, wherein upon completion of the test processing request, the priority access signal is deactivated, so that subsequent access to the bus is controlled by the predetermined priority criteria.

3. A data processing apparatus as claimed in claim 1, wherein upon completion of the test processing request, the test controller is arranged to access the results of the test processing request performed by the first master logic unit.

4. A data processing apparatus as claimed in claim 1, wherein the priority access signal comprises a priority enable signal arranged to cause the arbiter to assign the first master logic unit a higher priority than the test controller, such that the first master logic unit will be given access to the bus upon issuing its normal bus request signal.

5. A data processing apparatus as claimed in claim 1, wherein the first master logic unit comprises test logic for controlling testing of the first master logic unit in said normal test mode.

6. A data processing apparatus, comprising:
   one or more master logic units for accessing a bus in order to generate processing requests;
   a test controller for testing said master logic units of the data processing apparatus;

an arbiter for receiving bus request signals from the test controller and the one or more master logic units, and for applying predetermined priority criteria to control access to the bus by the test controller and the master logic units, the predetermined priority criteria identifying the relative priority of each master logic unit and the test controller;

in a normal test mode, the test controller having a higher priority than any of the master logic units to be tested; and in a master test mode, when master functionality of a first master logic unit is to be tested by the test controller, the arbiter being arranged to receive a priority access signal to cause the arbiter to assign the first master logic unit a higher priority than the test controller, in order to allow the first master logic unit to have access to the bus in order to generate a test processing request, wherein the priority access signal comprises a priority enable signal arranged to cause the arbiter to assign the first master logic unit a higher priority than the test controller, such that the first master logic unit will be given access to the bus upon issuing its normal bus request signal, wherein the master logic unit is arranged to assert its normal bus request signal to request access to the bus in order to enable the test processing request to be driven onto the bus, and the arbiter is arranged to grant the first master logic unit access to the system bus if the priority enable signal is asserted.

7. A data processing request as claimed in claim 6, wherein the master logic unit is arranged to disassert its normal bus request signal upon completion of the test processing request, thereby allowing the test controller to be granted access to the bus.

8. A data processing apparatus comprising:

one or more master logic units for accessing a bus in order to generate processing requests;

a test controller for testing said master logic units of the data processing apparatus;

an arbiter for receiving bus request signals from the test controller and the one or more master logic units, and for applying predetermined priority criteria to control access to the bus by the test controller and the master logic units, the predetermined priority criteria identifying the relative priority of each master logic unit and the test controller;

in a normal test mode, the test controller having a higher priority than any of the master logic units to be tested; and in a master test mode, when master functionality of a first master logic unit is to be tested by the test controller, the arbiter being arranged to receive a priority access signal to cause the arbiter to assign the first master logic unit a higher priority than the test controller, in order to allow the first master logic unit to have access to the bus in order to generate a test processing request, wherein the first master logic unit contains a test register from which the priority access signal is asserted, and the priority access signal is asserted to the arbiter by the first master logic unit when the first master logic unit is to be tested in said master test mode.

9. A data processing apparatus as claimed in claim 8, wherein upon initiating a test of the first master logic unit in said master test mode, the test controller is arranged to cause the priority access signal to be asserted via the test register of the first master logic unit.

10. A data processing apparatus as claimed in claim 9, wherein the test controller is arranged to write a first logic value into the test register to cause the priority access signal to be asserted.

11. A data processing apparatus as claimed in claim 10, wherein upon being granted access to the bus after completion of the test processing request by the first master logic unit, the test controller is arranged to write a second logic value into the test register of the first master logic unit to cause the priority access signal to be disasserted.

12. A data processing apparatus comprising:

one or more master logic units for accessing a bus in order to generate processing requests;

a test controller for testing said master logic units of the data processing apparatus;

an arbiter for receiving bus request signals from the test controller and the one or more master logic units, and for applying predetermined priority criteria to control access to the bus by the test controller and the master logic units, the predetermined priority criteria identifying the relative priority of each master logic unit and the test controller;

in a normal test mode, the test controller having a higher priority than any of the master logic units to be tested; and in a master test mode, when master functionality of a first master logic unit is to be tested by the test controller, the arbiter being arranged to receive a priority access signal to cause the arbiter to assign the first master logic unit a higher priority than the test controller, in order to allow the first master logic unit to have access to the bus in order to generate a test processing request, wherein:

the arbiter comprises a priority encoder for receiving the priority access signal and any bus request signals from the test controller and the one or more master logic units;

the arbiter being arranged to apply the predetermined priority criteria in the absence of said priority access signal in order to generate a signal identifying which of the test controller and master logic units requesting the bus has the highest priority; and the arbiter being arranged upon receipt of the priority access signal to assign the first master logic unit a higher priority than the test controller irrespective of the predetermined priority criteria and to generate a signal identifying the highest priority master logic unit requesting the bus.

13. A data processing apparatus as claimed in claim 12, wherein the arbiter further comprises grant generation logic for receiving the signal from the priority encoder, and for sending a bus grant signal to the test controller or one of the master logic units, as identified by the signal from the priority encoder.

14. A method of testing a master logic unit within a data processing apparatus, the data processing apparatus comprising one or more master logic units arranged to access a bus in order to generate processing requests, a test controller for testing logic units of the data processing apparatus, and an arbiter for receiving bus request signals from the test controller and the one or more master logic units, and for applying predetermined priority criteria to control access to the bus by the test controller and the master logic units, the predetermined priority criteria identifying the relative priority of each master logic unit and the test controller, the method comprising the steps of:

(a) arranging the test controller to initiate a test of master functionality of the first master logic unit in a master test mode;

(b) issuing a priority access signal to bit to cause the arbiter to assign the first master logic unit a higher priority than the test controller;

(c) granting the first master logic unit access to the system bus; and (d) arranging the first master logic unit to generate a test processing request.

15. A method as claimed in claim 14, wherein the priority access signal comprises a priority enable signal arranged to cause the arbiter to assign the first master logic unit a higher priority than the test controller, and said step (c) comprises granting the first master logic unit access to the bus when the first master logic unit issues its normal bus request signal.

16. A method as claimed in claim 15, wherein the master logic unit is arranged to assert its normal bus request signal to request access to the bus in order to enable the test processing request to be driven onto the bus, and the first master logic unit is granted access to the system bus at said step (c) if the priority enable signal is asserted.

17. A method as claimed in claim 16, wherein the master logic unit is arranged to disassert its normal bus request signal upon completion of the test processing request, thereby allowing the test controller to be granted access to the bus.

18. A method of testing a master logic unit within a data processing apparatus, the data processing apparatus comprising one or more master logic units arranged to access a bus in order to generate processing requests, a test controller for testing logic units of the data processing apparatus, and an arbiter for receiving bus request signals from the test controller and the one or more master logic units, and for applying predetermined priority criteria to control access to the bus by the test controller and the master logic units, the predetermined priority criteria identifying the relative priority of each master logic unit and the test controller, the method comprising the steps of:

(a) arranging the test controller to initiate a test of master functionality of the first master logic unit in a master test mode;

(b) issuing a priority access signal to the arbiter to cause the arbiter to assign the first master logic unit a higher priority than the test controller;

(c) granting the first master logic unit access to the system bus; and (d) arranging the first master logic unit to generate a test processing request, wherein said step (b) comprises the step of the first master logic unit asserting the priority access signal to the arbiter when the first master logic unit is to be tested in said master test mode.

19. A method as claimed in claim 18, wherein upon initiating a test of the first master logic unit in said master test mode at said step (a), the test controller is arranged to cause the priority access signal to be asserted by the first master logic unit at said step (b).

* * * * *

UNITED STATES PATENT AND TRADEMARK OFFICE
CERTIFICATE OF CORRECTION

PATENT NO. : 6,463,488 B1
DATED : October 8, 2002
INVENTOR(S) : Martin Martin San Juan It is certified that error appears in the above-identified patent and that said Letters Patent is hereby corrected as shown below:

<u>Title page,</u>
Item [75], Inventor, "Martin San Juan" should read -- Martin Martin San Juan --

Signed and Sealed this

Twenty-ninth Day of July, 2003

JAMES E. ROGAN
*Director of the United States Patent and Trademark Office*